Jan. 12, 1943. W. G. BETZ Re. 22,247
PIANO ACTION
Original Filed Nov. 15, 1940
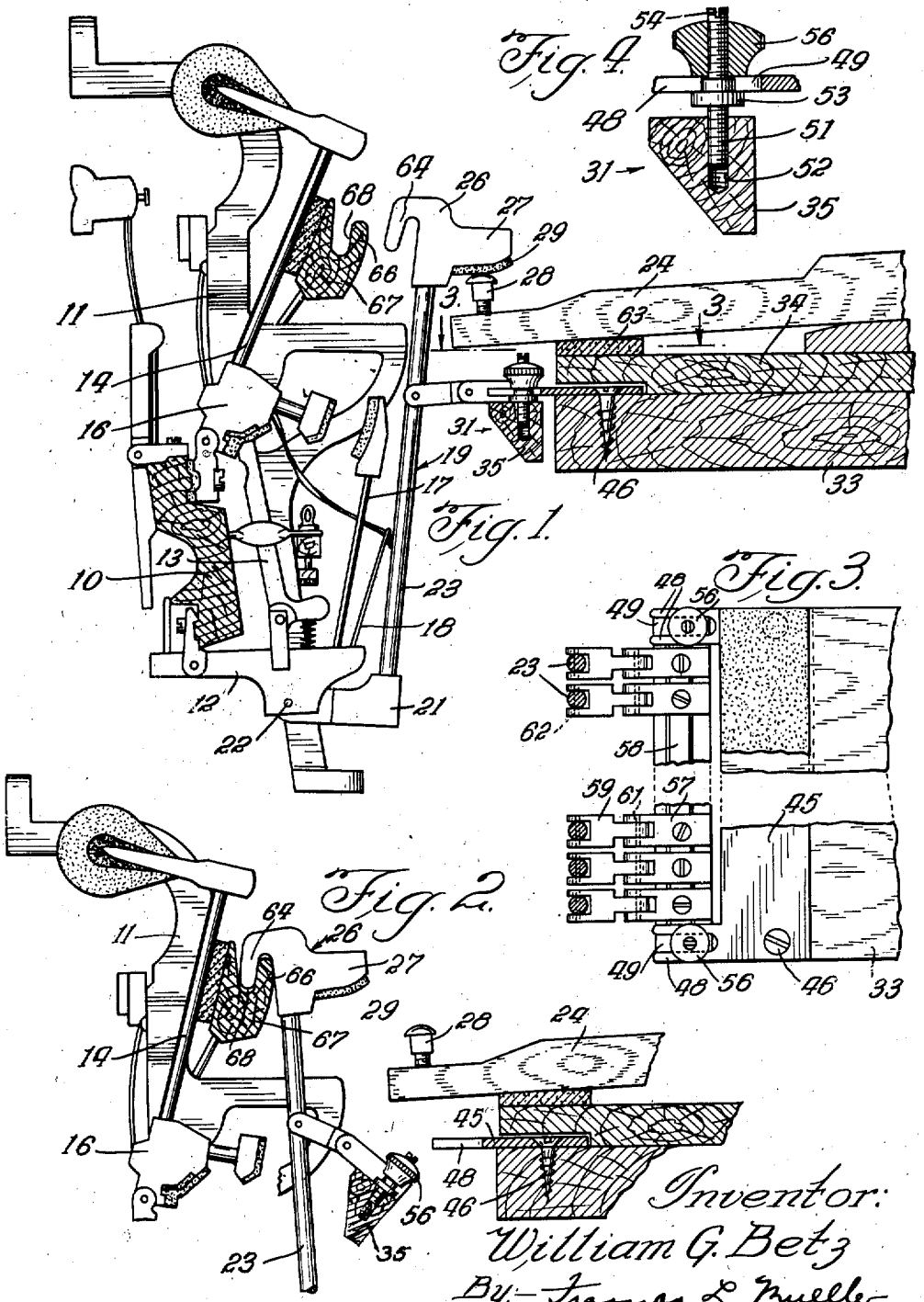
Inventor:
William G. Betz
By:- Foorman L. Mueller
Atty.

Reissued Jan. 12, 1943

Re. 22,247

UNITED STATES PATENT OFFICE 22,247

PIANO ACTION

William G. Betz, Pine Castle, Fla., assignor to Pratt, Read & Company, Ivoryton, Conn., a corporation of Connecticut Original No. 2,260,287, dated October 28, 1941, Serial No. 365,789, November 15, 1940. Application for reissue August 8, 1942, Serial No. 454,161

15 Claims. (Cl. 84—240)

This invention relates in general to piano actions and in particular to improvements in a drop-type action for a low upright piano.

In many drop-type actions of the prior art for low upright pianos, the abstracts at one end are connected to the corresponding whip by an axial connection, or by a sliding contact and extend upwardly to the key for operative connection therewith. The abstracts are connected to the keys by inserting the top portions in slots in the ends of the keys, with such top portions free of the remainder of the action when disconnected. The abstracts, therefore, when disconnected from their associated keys tend to fall one way or the other with reference to the remainder of the action, and normally forwardly away from the action. Throughout the final manufacturing steps in the assembly of the action when they are entirely separate from the keys, the abstracts are often in the way unless special precautions are taken to retain them, and they may be particularly awkward and clumsy to handle and pack for shipping. The same difficulty applies when unpacking and getting the action ready for assembly in a piano case. This general difficulty is further aggravated in this type by the fact that each abstract must be individually connected and disconnected from its associated key. These conditions affect the cost of manufacturing the action and the assembly of the action with the remaining portions of the piano, and also affect the labor and material costs for packing and shipping.

Where attempts have been made in the prior art to overcome these difficulties, supports are provided for the top portions of the abstracts arranged above the rear end of the piano keys, or above such top portions themselves. These superstructures, which they become in some instances, decrease the working space above the action so that considerable trouble and inconvenience is encountered in adjusting the remaining portions of the action before or after an abstract is connected with its associated key. In addition, these devices are rather complicated and expensive.

It is an object of this invention, therefore, to provide an improved drop-type action for low upright pianos.

Another object of this invention is to provide a simple, relatively inexpensive action which when assembled in a piano is connected with the keys merely by insertion of the keys in the piano, separate handling of the individual abstracts for the action being eliminated.

Another object of this invention is to provide improved guide means for the abstracts of a piano action which will leave the space at the top of the abstracts, and hence the general top portion of the action, open so that all of the action elements are readily available for adjustment and repair.

Another object of this invention is to provide an improved abstract and abstract guide means for a piano action which is simple and rugged in construction, easily assembled, efficient in operation, and of standard design for a plurality of piano sizes, so as to in all reduce manufacturing and servicing costs to a minimum.

One of the principal advantages of this invention is the provision of an action which is transportable, and assembled in a piano as a single self-contained unit, and which may be connected with the keys merely by insertion of the keys into the piano, without individual handling of the abstracts in the action.

One of the features of this invention is the provision of an improved guiding means for a pivoted abstract which is operatively connected to the abstract intermediate the top and bottom thereof and arranged entirely forwardly of the abstract and entirely below the head portion thereof so that ready access is had to the remainder of the action portions for adjustment and assembly purposes.

A further feature of this invention is the provision of an improved guiding means for the abstracts which is removably mounted on the key supporting means in the piano and movable with the abstracts on movement of the action to and from assembly in the piano. The guide means operatively connected with the abstracts concurrently moves all of the abstracts to a rest position adjacent the remainder of the action, so that the abstracts and remaining portions of the action can be handled together as a compact unit.

A still further feature of this invention is the provision of improved guide means for the abstracts of a piano action which includes a mounting member arranged transversely of all of the abstracts, common to all of such abstracts, and adjustably supported on the key supporting means for the piano, with individual guide means for each abstract adjustable relative to the transverse mounting member.

Further objects, features and advantages of this invention will become apparent from the following description when taken in connection with the accompanying drawing, in which:

Fig. 1 is an elevation partly in cross-section of one of the units of a complete piano action and the associated guide means of the present invention;

Fig. 2 is a fragmentary view of the structure of Fig. 1 showing parts thereof in a changed position;

Fig. 3 is a fragmentary detailed plan view of the guiding means for the abstracts, as seen along the line 3—3 of Fig. 1; and Fig. 4 is a detailed view of an adjusting screw for the abstract guiding means shown in Fig. 1.

With reference to Fig. 1, the action is shown as supported principally on a rail 10 which in turn is mounted on a plurality of mounting brackets 11. The whip 12 is pivotally connected in a suitable manner to the rail 10 and in turn pivotally supports a jack or fly 13. The jack is in engagement in the usual manner with a hammer 14 at the butt 16 for said hammer, and as the whip 12 is raised, this motion is transmitted through the jack to pivot the hammer into striking engagement with the corresponding piano string. A back-check 17 and bridle strap wire 18 are both supported on the whip. An abstract 19 includes a lower or foot portion 21 which is pivotally connected by pin 22 to the whip 12. A lifter rod or body portion 23, illustrated as being provided in wood, is secured at one end in the portion 21 and at its other end in a top or head portion 26. Head portion 26 is formed with an extension 27 which projects directly over a capstan 28 mounted near the rear end of the key 24. Connection of the key 24 with the abstract 19 is made through the abutting engagement of the capstan 28 with a felt bushing 29 on the lower side of the head portion 26.

The abstract 19 connected intermediate the whip and capstan screw as above described, and guided in its playing movement as will be hereinafter described, moves in a substantially straight-line direction so far as the position of the body portion 23 is concerned, and the slight deviation thereof from such direction, together with the very slight arcuate movement of the capstan 28, produces merely a slight rocking movement between the head 26 and the capstan screw. As a result, there is little or no friction due to relative travel between the capstan and the abstract head, which greatly reduces, and in fact substantially eliminates any wear on the felt bushing 29 on the abstract head. This lack of relative travel and friction between the abstract head and capstan screw also permits a fast recovery of the abstract after each playing stroke of the key 24, so that the action is capable of efficient operation, requiring merely a relatively light touch on the key, and providing fast repetition. The slight, if any, wear on the bushing 29 not only reduces the cost of repairs, but also assures a better playing action throughout the life of the piano.

As can be readily understood from a consideration of Fig. 1, although the abstract is pivotally connected into the action at the lower portion thereof by the pin 22, the top portion is entirely free of the remainder of the action. However, the abstract is retained in proper playing position relative to keys and guided in its playing movement by guide means designated generally by the reference character 31 and supported entirely independently of the action on the means for supporting the keys 24 within the piano case. At least, so far as the piano patent art is concerned, there seems to be no uniformity of nomenclature for the general structure which supports the keys in the piano as a whole. Furthermore, the structure for supporting the keys varies in the illustrations in the patent art, and also in commercial practice. The general structure described herein as key supporting means, for purposes of illustration may be described more specifically as including a keybed 33, which is normally a heavy wooden member or unit rigidly secured in the piano, and a key frame 34 secured to said key bed and supporting the keys 24 thereon. The keys 24 are normally mounted on the key frame 34 for transporting and for assembly into the piano. However, it is understood that the invention is not limited solely to this particular structure for the key supporting means.

The guide means 31 for the abstracts comprises a rail 35, supported on bracket members 45, of a suitable number to rigidly mount the rail, and these brackets in turn are rigidly but removably secured to the key supporting means, and more specifically, to the keybed 33 by means of screws or bolts 46. There may be a plurality of brackets 45 secured to the keybed 33 and each positioned within a cavity at the rear end of the key frame 34, as shown in Fig. 1, or the bracket 45 may consist of a one-piece member extending entirely transversely of the piano case, and mounted as described on the keybed 33. On each individual bracket or at intervals on the one-piece bracket 45, there are integral rearwardly extending portions comprising a pair of fingers 48 on each side of a slot 49 extending longitudinally of such portion, for receiving a mounting unit for the rail.

Each mounting unit includes an adjusting screw with a threaded shank 51 (Figs. 1 and 4) threadably secured in a corresponding bore 52 in the rail 35. As is evident from Fig. 4 the bore 52 is deeper than the length of the shank from the bottom end thereof to a rigid collar 53 intermediate the ends. As a result the adjusting screw may be turned at the slot 54 in its head, when the mounting unit as a whole is free on the bracket fingers 48. This provides for relative vertical movement between the screw and the rail 35 to position the rail at the proper vertical height with reference the abstracts for the action. The body of the screw above the collar 53 is insertable into the slot 49, and the mounting unit as a whole may be releasably clamped on the bracket fingers in the desired longitudinal position by tightening down a knurled nut 56 so that the annular shoulder on the collar 53 frictionally engages the lower face of the fingers while the nut 56 engages the top face thereof.

The rail 35 is common to all of the abstracts 19 in the piano action and a guide unit is provided on the rail for each individual abstract. Each guide unit comprises a flange 57 rigidly secured to the top surface of the rail 35 and maintained against rotation relative to such rail by means of a tongue 58 on the rail fitting in a corresponding groove in the underside of the flange 57. This mounting does permit of a slight adjustment between the flange 57 and rail 35 if necessary, by "shimming" the flange 57 slightly or paring the tongue 58 with a knife or chisel in a manner such that the flange may be moved to a desired position. A second flange or link 59 is pivotally connected to the flange 57 by a pin 61 and in turn is axially or pivotally connected to the body 23 of the corresponding abstract by a pin 62. This arrangement permits a free up and down movement of the abstract but restricts the path of movement so that the abstract is maintained in alignment with its corresponding key to maintain the proper connection between the capstan screw 28 and the bushing 29 on the abstract head.

Since the abstracts 19 with the common guide means 31 operatively connected thereto are free to fall forwardly away from the remainder of the action when such guide means is disconnected from the key supporting means, and thus would complicate handling and assembly, means are provided to maintain the abstracts and guide means in a position of rest adjacent the remainder of the action. Such means includes a hooked portion 64 rearwardly on the head 26 of each abstract and a corresponding flange 66 on the hammer rail 67 extending the entire length of the hammer rail in the piano action, and forming therebehind an elongated groove 68. The abstracts and guide means can be hooked in a position of rest by merely lifting the rail 35 to move the abstracts therewith to a height and position such that the projections or hooked portions 64 fit into the groove 68 in the hammer rail. The entire action and associated abstract guide means may therefore be handled as a complete unit for assembly and shipping purposes.

As for the assembly of the action and guide means in a piano case, this is accomplished by mounting the brackets 11 for the action frame in an appropriate manner in the piano case rearwardly of the keybed 33 and by securing the bracket or brackets 45 rigidly on the keybed 33. The key frame 34 and keys are then mounted in the piano and the keys 24 individually, or in multiple, are positioned with the capstans 28 slipping under the beveled lips of the abstract heads 26 to accomplish operative connection between the capstans and abstract. The rail 35 is adjusted longitudinally and vertically and then clamped in final adjusted position so that the abstract and guide means are properly aligned and positioned in playing position with reference to the keys 24.

Although only the preferred embodiment of the invention has been illustrated and described it is understood that modifications and alterations can be made therein which are within the full intended scope of the appended claims.

I claim:

1. In a piano having keys and supporting means for the keys and an action including frame means for supporting the action in the piano and a whip pivotally supported on said frame means, the combination of an abstract with a body portion entirely rearwardly of the rear end of a corresponding key and a portion at one end overhanging the rear end of such corresponding key for operative connection therewith, means axially connecting the other end of said abstract to said whip, and transverse means operatively connected with the abstract intermediate the other end and said overhanging portion thereof and extending forwardly from said abstract body for mounting on the key supporting means entirely independent of the action frame means and entirely below the level of the keys, said transverse means including guide means thereon individual to said abstract and operatively connected therewith intermediate the top and bottom of said abstract to guide the abstract in the normal playing movement thereof, means removably securing said transverse means to said key supporting means with said transverse means being removable from said key supporting means while the abstract and whip connection is maintained and likewise remaining operatively connected with said abstract and adapted to be transportable in such condition with said action frame means to provide said action and said transverse means as a single interconnected transportable unit.

2. In a piano having a plurality of keys and supporting means for the keys and an action including a plurality of abstracts corresponding to said keys, said abstracts each having a top portion for operative connection with a corresponding key and a lower portion operatively connected into said action, the means for guiding said abstracts in their normal playing movement including a rail common to all of said abstracts, means for supporting said rail on said key supporting means so that said rail is positioned entirely below the level of the top surface of said keys, and a guide unit individual to each abstract, means for mounting each of said guide units on said rail and each guide unit operatively connected with its corresponding abstract at a portion of said abstract intermediate the top portion and lower portion thereof, but nearer to said top portion than to said bottom portion with said guiding means being movable with said abstracts upon disconnection of said guiding means from said key supporting means.

3. In a piano having keys with a capstan screw on the end of each, supporting means for the keys, and an action including frame means and a plurality of striking members supported on said frame means, the combination of means for operatively connecting each striking member and its corresponding capstan screw on a key, and means for guiding at least a portion of said operatively connecting means in the playing movement thereof, said guiding means including rail means common to all of said operatively connecting means extending transversely of the piano and a plurality of guide units thereon, and means for removably supporting said rail means on said key supporting means so that said rail means and associated guide units are entirely below the top surface of the keys and adjacent the lower surface of said keys.

4. In a piano action having frame means, a whip and an interconnected abstract all transportable as a single unit, with the abstract adapted for connection with a capstan on a piano key by sliding insertion of the key into the piano, the means for guiding said abstract in a normal playing movement including an elongated rail extending transversely of the piano, means for mounting said rail in said piano in a position intermediate the connection for the whip and abstract and the connection for the abstract and capstan and forwardly of the abstract, and a guide unit mounted on said rail and extending rearwardly substantially at right angles thereto having a portion in operative engagement with the abstract intermediate the aforesaid connections to permit up and down movement of the abstract but restrict the path for such movement, with said guide means being likewise transportable with said action in said single unit.

5. In a piano action for a piano having keys, and key supporting means, said action including a whip, an abstract connected at one end to said whip and free of the remainder of the action at its other end, axis means pivotally connecting said abstract at said one end to said whip, means operatively connected with said abstract intermediate the ends thereof for guiding the abstract in its normal playing movement, said guiding means being removably connected to said key supporting means and movable on removal from said key supporting means to pivotally move said abstract to a rest position adjacent the remainder of said action and remain with such abstract in such position, and means removably connecting said guiding means to said key supporting means.

6. In a piano action for a piano having key supporting means, the combination of a plurality of abstracts, a whip corresponding to each of said abstracts, means pivotally connecting each of said abstracts at one end thereof to its corresponding whip and each abstract being free of the remainder of the action at its other end, means operatively connected with each of said abstracts intermediate the ends thereof for guidably supporting the abstracts when they are operated for playing, means removably connecting said guiding means to said key supporting means, said guiding means on disconnection from said key supporting means being movable to pivotally move all of said abstracts to a rest position adjacent said remainder of said action, and means including said guiding means for retaining the abstracts in said rest position.

7. In a piano action for a piano having key supporting means, and including a plurality of abstracts rearwardly of the key supporting means, the means for guiding the playing movement of said abstracts including a rail member common to all of said abstracts arranged forwardly of said abstracts and extending transversely thereof, and means for adjustably mounting said rail including bracket means mounted on said key supporting means near the rear end thereof having projecting portions extending rearwardly of said key supporting means, adjustable screw means slidably supported on each projecting portion threadably connected to said rail and movable vertically relative to said rail, a shoulder portion on said screw means operatively engageable with one side of the corresponding projecting portion, and a threadable head on said screw means operatively engaging the other side of such projecting portion and releasably locking the screw on the projection portion intermediate the shoulder and head.

8. In a piano action for a piano having key supporting means, and including a plurality of abstracts, with each of said abstracts being pivotally connected at one end to said piano action and free of the action at its other end, and operated for playing in a substantially vertical direction, the combination of means for guiding the playing movement of said abstracts including bracket means mounted on said key supporting means near the rear end thereof, said bracket means having slotted portions projecting rearwardly of said key supporting means, adjustable screw means slidably and removably supported in each said slotted portion but frictionally engageable therewith for locking in an adjusted position, a rail member common to all of said abstracts arranged forwardly of said abstracts and extending transversely thereof, said rail member being supported from said brackets by threaded engagement with a portion of said adjustable screw means, and individual guide members on said rail member operatively connected with a corresponding abstract, with each of said guide members being operatively connected to said abstract between the said ends thereof, with adjustment of said screw means moving said rail laterally and vertically relative to said brackets to adjust the playing movement of said abstracts, said screw means, rail member and connecting members, on removal of said screw means from said slotted bracket portions being movable with said abstracts to pivotally and concurrently move said abstracts to a rest position adjacent the remainder of said action.

9. The combination with a plurality of pivoted abstracts for a piano action, with each of said abstracts having a lower portion pivotally connected to said action and a top portion free of the remainder of said action and operatively associated with a piano key, of means for maintaining the abstracts in a substantially upright position independently of any connection with the piano keys, including a rail mounted in said action rearwardly of said abstracts and extending transversely thereof, said rail having a longitudinally extending upwardly projecting lip portion formed near the forward side thereof, with each of said abstract head portions being formed with a downwardly extending hooked projection engageable with said lip portion, and means common to all of said abstracts for pivotally and concurrently lifting said abstracts to engage said hooked projections with the lip portion on said rail member, with said engagement retaining the abstracts in said substantially upright position.

10. The playing mechanism for a piano having a plurality of keys and key supporting means, such mechanism being adapted for operative connection with said keys and being transportable and movable in and out of the piano as a unit, including frame means, a plurality of whips corresponding to said keys, a plurality of abstracts each having a lower portion operatively connected to a whip and movable with the remainder of the playing mechanism when transporting said mechanism and moving it in and out of a piano and having an upper portion operatively connected to a corresponding key, and guide means including rail means for removable mounting on said key supporting means, and an apertured guide member supported on said rail means corresponding to each abstract and operatively connected therewith intermediate the upper and the lower portions thereof.

11. In a piano having a plurality of keys and supporting means for said keys, the combination of playing mechanism for operative connection with said keys which is transportable and movable in and out of the piano as a unit, including frame means, a plurality of whips corresponding to said keys, a plurality of abstracts each having a lower portion operatively connected to a whip and movable with the remainder of the playing mechanism when transporting said mechanism and moving it in and out of a piano and having an upper portion operatively connected to a corresponding key, guide means including rail means for positioning at the rear of the key supporting means for removable mounting thereon having a portion with guide apertures therein and with each guide aperture operatively connected with a corresponding abstract intermediate the upper and the lower portions thereof, and means for removably mounting said guide means on said key supporting means having means permitting mounting of said guide means at various positions rearwardly relative to the rear end of said key supporting means.

12. A piano action for a piano having a key, including in combination an abstract corresponding to the key pivotally connected at its lower end in said action and free of the action at its upper end so as to normally fall pivotally forwardly away from said action on disconnection from said key, means for retaining said abstract adjacent said piano action when it is disconnected from said key, including a hammer rest rail in said action having an abstract retaining portion, with said hammer rail being normally free of said abstract, and means on the abstract adapted to be releasably connected with said retaining portion to retain said abstract at said hammer rail, said abstract being movable into a retaining connection with said retaining portion on pivotal movement of said abstract rearwardly away from the key and toward said piano action.

13. A piano action for a piano having a key, including in combination an abstract corresponding to said key having a head portion at one end connectible and disconnectible with said key, said head portion being free of the piano action and the opposite end of said abstract being pivotally connected with said action so that said abstract normally falls pivotally forwardly away from the action on disconnection of said head portion and key, means for retaining said abstract adjacent said piano action on disconnection of said head portion and key including a hammer rest rail in said action extended longitudinally in a direction transversely of said abstract and free of the abstract during playing of the piano action, an abstract retaining portion on said hammer rail at the forward side of said rail, and a portion on said head portion movable into a position for releasable connection with said retaining portion on pivotal movement of said abstract rearwardly toward said piano action.

14. A piano action including an abstract pivotally connected at its lower end to said action and free of the action at its upper end so as to normally fall pivotally forwardly away from said action, means for retaining said abstract in a substantially upright position including a hammer rest rail in said action free of the abstract during playing of the piano action, said hammer rail having a recess therein, and a portion at the upper end of said abstract receivable in said recess to releasably retain said abstract at said hammer rail, with said portion being movable into a retaining position with said hammer rail on pivotal movement of said abstract rearwardly toward the action to permit transportation of the piano action with the normally forwardly pivotal abstract in a retained position.

15. A piano action for a piano having a key, including in combination an abstract corresponding to said key having a lower portion pivotally connected to said action, and an upper portion free of the remainder of the action and separably connected with said key, means for maintaining said abstract in a substantially upright position independently of any connection of said piano key including a hammer rest rail in said action, said hammer rail having a longitudinally extending groove therein, said upper portion being receivable in said groove on pivotal movement of said abstract rearwardly toward said action to retain the abstract in said substantially upright position and permit transportation of the piano action with the abstract in a retained position.

WILLIAM G. BETZ.